US012800754B2

(12) United States Patent
Le Gall et al.

(10) Patent No.: US 12,800,754 B2
(45) Date of Patent: Nov. 17, 2026

(54) DETECTION OF OBJECTS WITH A SYNTHETIC ANTENNA

(71) Applicant: THALES, Meudon (FR)

(72) Inventors: Yann Le Gall, Elancourt (FR); Andreas Arnold, Sophia Antipolis (FR); Mathieu Simon, Elancourt (FR); Nicolas Burlet, Elancourt (FR)

(73) Assignee: THALES, Meudon (FR)

(*) Notice: Subject to any disclaimer, the term of this patent is extended or adjusted under 35 U.S.C. 154(b) by 188 days.

(21) Appl. No.: 18/701,597

(22) PCT Filed: Nov. 15, 2022

(86) PCT No.: PCT/EP2022/081984
§ 371 (c)(1),
(2) Date: Apr. 15, 2024

(87) PCT Pub. No.: WO2023/088895
PCT Pub. Date: May 25, 2023

(65) Prior Publication Data

US 2025/0130328 A1 Apr. 24, 2025

(30) Foreign Application Priority Data

Nov. 18, 2021 (FR) ....................................... 2112194

(51) Int. Cl.
*G01S 13/90* (2006.01)
*G01S 15/89* (2006.01)

(52) U.S. Cl.
CPC ...... *G01S 13/9019* (2019.05); *G01S 13/9027* (2019.05); *G01S 15/8904* (2013.01)

(58) Field of Classification Search
None
See application file for complete search history.

(56) References Cited

U.S. PATENT DOCUMENTS 3,950,723 A * 4/1976 Gilmour .............. G10K 11/346 367/12
4,119,938 A * 10/1978 Alais .................... G01N 29/262 73/620

(Continued)

FOREIGN PATENT DOCUMENTS

FR 2 901 364 A1 11/2007

OTHER PUBLICATIONS

Hansen, Roy Edgar, et al. "Challenges in seafloor imaging and mapping with synthetic aperture sonar." IEEE Transactions on geoscience and Remote Sensing 49.10 (2011): 3677-3687. (Year: 2011).*

(Continued)

*Primary Examiner* — Jonathan D Armstrong
(74) *Attorney, Agent, or Firm* — Baker Hostetler

(57) ABSTRACT

A computer-implemented method includes receiving a series of measurements of distances generated, from a plurality of different positions each time, by a detection system operating by: transmitting a wave; receiving waves reflected by the environment; determining the distances by calculating differences between the wave transmission time and the time of reception of the reflected waves; generating, based on the series of distance measurements, a synthetic image representing the distances from the environment relative to a reference position; for each focal distance of a plurality of focal distances: generating, from the series of distance measurements or the synthetic image, a synthetic image that is focused at the focal distance, by applying compensation for penumbra effects; and detecting the presence of an object in the focused synthetic image.

15 Claims, 7 Drawing Sheets

(56) References Cited

U.S. PATENT DOCUMENTS

| | | | | | |
|---|---|---|---|---|---|
| 4,204,281 | A * | 5/1980 | Hagemann | G01S 3/84 | 367/113 |
| 5,181,254 | A * | 1/1993 | Schweizer | G06V 10/44 | 382/280 |
| 5,214,744 | A * | 5/1993 | Schweizer | G01S 7/539 | 708/801 |
| 5,412,618 | A * | 5/1995 | Gilmour | G10K 11/355 | 367/104 |
| 5,886,950 | A | 3/1999 | Billon | | |
| 11,860,640 | B2 * | 1/2024 | Motoyama | G05D 1/0246 | |
| 2007/0161904 | A1 * | 7/2007 | Urbano | A61B 8/4438 | 600/459 |
| 2008/0140341 | A1 * | 6/2008 | Ralston | G01N 21/4795 | 702/155 |
| 2009/0016161 | A1 * | 1/2009 | Gendron | G01S 7/539 | 367/88 |
| 2009/0175128 | A1 * | 7/2009 | Jean | G01S 15/8904 | 367/91 |
| 2009/0179790 | A1 * | 7/2009 | Jahangir | G01S 15/8904 | 342/25 B |
| 2012/0281507 | A1 * | 11/2012 | Rikoski | G01S 15/89 | 367/88 |
| 2015/0359512 | A1 * | 12/2015 | Boctor | G01S 15/8997 | 600/447 |
| 2021/0019536 | A1 * | 1/2021 | Motoyama | G05D 1/0246 | |
| 2021/0304380 | A1 * | 9/2021 | Richert | G06T 7/90 | |
| 2021/0349468 | A1 * | 11/2021 | Bukhari | G05D 1/242 | |
| 2022/0057519 | A1 * | 2/2022 | Goldstein | G01S 17/88 | |
| 2022/0187509 | A1 * | 6/2022 | Taveniku | H04N 23/676 | |

OTHER PUBLICATIONS

Del Rio Vera, J., et al. “Automatic target recognition in synthetic aperture sonar images based on geometrical feature extraction.” EURASIP Journal on Advances in Signal Processing Jan. 2009 (2009): 109438. (Year: 2009).*

Lopera, Olga, and Yves Dupont. “Automated target recognition with SAS: Shadow and highlight-based classification.” 2012 Oceans. IEEE, 2012. (Year: 2012).*

Buskenes, Jo Inge, et al. “Real-time sonar image simulation for adaptive template matching in automatic target recognition.” IEEE Journal of Oceanic Engineering 49.4 (2024): 1488-1500. (Year: 2024).*

Groen, et al., “Shadow enhancement in synthetic aperture sonar using fixed focusing”, IEEE Journal of Oceanic Engineering, vol. 34, No. 3, pp. 269-284, 2009.

Buffington, et al., “Correction of atmospheric distortion with an image—sharpening telescope”, Jour. Acoust. Soc. Am., vol. 67, No. 3, pp. 298-303, Mar. 1977.

* cited by examiner

DETECTION OF OBJECTS WITH A SYNTHETIC ANTENNA

CROSS-REFERENCE TO RELATED APPLICATIONS

This application is a National Stage of International patent application PCT/EP2022/081984, filed on Nov. 15, 2022, which claims priority to foreign French patent application No. FR 2112194, filed on Nov. 18, 2021, the disclosures of which are incorporated by reference in their entirety.

FIELD OF THE INVENTION

The present invention relates to the field of the detection of objects based on sensor signals. More specifically, it relates to the detection of objects in synthetic-antenna signals, carried out by combining distance measurements at various points.

BACKGROUND

A sonar is a measuring device that is widely used in underwater navigation for detecting/locating objects in the water and measuring their distance. An active sonar operates as follows:

- a sound wave is emitted;
- the sound wave is reflected by objects present in the water and the seabed;
- the sound waves thus reflected are picked up at a point close to the point of emission. The time differences between emission and reception and the intensity of the reflected wave make it possible to determine the distance from the closest point (object or seabed) in a given direction;
- the distances for the various directions are aggregated to form a sonar image, which actually represents the distances from the points closest to the sonar in the various directions.

An object in a sonar image may be detected using the shape of the echo of the object in the image, but also using its shadow, that is to say the shape of the portion of the seabed that is not reached by the sound wave emitted by the sonar, because it is masked by the object.

In order to improve the resolution of a sonar, what is known as a synthetic-antenna sonar system may be used. Synthetic-antenna sonar aims to improve resolution at a given range without increasing the physical linear dimension of the reception antenna. The principle of synthetic-antenna sonar consists in using a composite physical antenna formed by a linear array of N transducers. In this type of sonar, when the carrier is moving forward, an emitter, or emission antenna, emits M successive pulses in an elementary sector that is fixed with respect to the carrier. The signals received by the N transducers of the physical reception antenna at M instants, and therefore at M successive locations, are used to form the beams of the synthetic antenna. The resolution of the images that are obtained, that is to say the resolution of the beams of the synthetic antennas ("array beam resolution"), is substantially equivalent to that of a virtual antenna the length of which corresponds to the length traveled by the physical antenna during these M successive instants.

Synthetic-antenna sonars are widely used because they make it possible to significantly improve sonar resolution without having to make any hardware changes.

However, the shadows of objects perceived by synthetic-antenna sonars are affected by a penumbra effect, also known as a parallax effect: since the angles of emission of the wave and of reception of the echoes are modified between each image capture, the directions of the shadows are modified between each image capture. When the synthetic image is generated, the shadows are thus blurred.

In some cases, for example when an object has its height stretched, or is floating between two bodies of water, the shadow may even become practically undetectable. This may be the case for example with a school of fish.

A similar problem may be encountered for other types of synthetic antennas, that is to say sensors operating on the principle of emitting and receiving waves at various points, and generating a synthetic image based on reflected waves received at the various points. This is the case for example for synthetic-aperture radars, or certain types of ultrasound.

There is therefore a need for improved detection, using synthetic antennas based on the emission of waves and the reception of waves reflected at various points, of objects the shadow cast by which is subject to penumbra effects.

SUMMARY OF THE INVENTION

To this end, one subject of the invention is a computer-implemented method comprising: receiving a series of distance measurements generated, from a plurality of respectively different positions, by a detection system that operates by: emitting a wave; receiving waves reflected by the environment; determining distances by computing differences between the time of emission of the wave and the times of reception of the reflected waves; generating, based on said series of distance measurements, a synthetic image representing the distances of the environment from a reference position; for each focusing distance of a plurality of focusing distances: generating, based on said series of distance measurements or said synthetic image, a synthetic image focused at said focusing distance by applying penumbra effect compensation; detecting the presence of an object in said focused synthetic image.

Advantageously, the detection system is a sonar system, and the generation of the synthetic image defines a synthetic-antenna sonar.

Advantageously, detecting the presence of an object in said focused synthetic image comprises applying a supervised machine learning engine trained with a learning base comprising focused images of shadows of objects of the same type as said object.

Advantageously, the method comprises: prior to the detection: computing, for each pixel of the focused synthetic image, a ratio between the intensities of the pixel in the synthetic image and the synthetic image; thresholding the pixels of the synthetic image for which this ratio is greater than a threshold; applying a mathematical morphology operation to the thresholded pixels; applying said detection to the output of said mathematical morphology operation.

Advantageously, the plurality of focusing distances comprises a plurality of initial focusing distances defined by a first distance pitch over a first range of focusing distances, the method comprising: a step of defining a plurality of refined focusing distances, which are defined by: a second range of focusing distances, narrower than the first, around a first focusing distance of said plurality of initial focusing distances, at which the presence of an object has been detected; a second distance pitch, less than the first; for each focusing distance from among said plurality of refined focusing distances, said generating, based on said series of distance measurements, a synthetic image focused at said focusing distance by applying penumbra effect compensation.

Advantageously, the step of generating, based on said synthetic image, a synthetic image focused at said focusing distance by applying penumbra effect compensation is carried out by applying a one-dimensional filter to the synthetic image.

Advantageously, the method as claimed in claim 1 comprises: generating a modified focused synthetic image by adding a shadow associated with a label to said synthetic image focused at said focusing distance; generating a modified synthetic image by applying an inverse filter of said one-dimensional filter to the modified focused synthetic image; enriching a learning base for detecting the presence of objects with the modified focused synthetic image, said focusing distance and said label.

Advantageously, the method comprises, in the event of detection of the presence of an object in said focused synthetic image, generating a composite image based on said synthetic image and said focused synthetic image.

Advantageously, said generating the composite image comprises: detecting shadows in the focused synthetic image; assigning the following for each pixel of the composite image: the intensity value of the corresponding pixel of the focused synthetic image for each pixel belonging to a shadow; the intensity value of the corresponding pixel of the synthetic image otherwise.

Advantageously, said generating the composite image comprises assigning, for each pixel of the composite image, an intensity value equal to the weighted sum of the intensity value of the corresponding pixel of the focused synthetic image and of the intensity value of the corresponding pixel of the synthetic image, where, for each pixel, the relative weight of the intensity value of the corresponding pixel of the focused synthetic image increases with an index of belonging to a shadow of the pixel.

Advantageously, the method comprises defining a region of interest of the synthetic image, wherein the steps of generating, based on said series of distance measurements, a synthetic image focused at said focusing distance by applying penumbra effect compensation and detecting the presence of an object in said focused synthetic image are carried out only in the region of interest.

Advantageously, the region of interest of the synthetic image comprises: displaying the synthetic image on a graphical interface; the user drawing a rectangle defining the region of interest.

Advantageously, the method comprises displaying the focused or composite image inside said rectangle.

Another subject of the invention is a computer program product comprising computer code instructions that, when the program is executed on a computer, cause said computer to execute the method according to one of the embodiments of the invention.

Another subject of the invention is a data processing system comprising a processor configured to implement the method according to one of the embodiments of the invention.

Another subject of the invention is a computer-readable recording medium comprising instructions that, when they are executed by a computer, cause said computer to implement the method according to one of the embodiments of the invention.

BRIEF DESCRIPTION OF THE DRAWINGS

Other features, details and advantages of the invention will become apparent on reading the description given with reference to the appended drawings, which are given by way of example and in which, respectively.

DETAILED DESCRIPTION

The invention will be illustrated by examples relating to the detection of objects using a synthetic-antenna sonar. However, it is more generally applicable to any type of synthetic antenna based on the emission of waves at various points, the reception of reflected waves, and the generation of a synthetic image based on the reflected waves.

Figure 1:
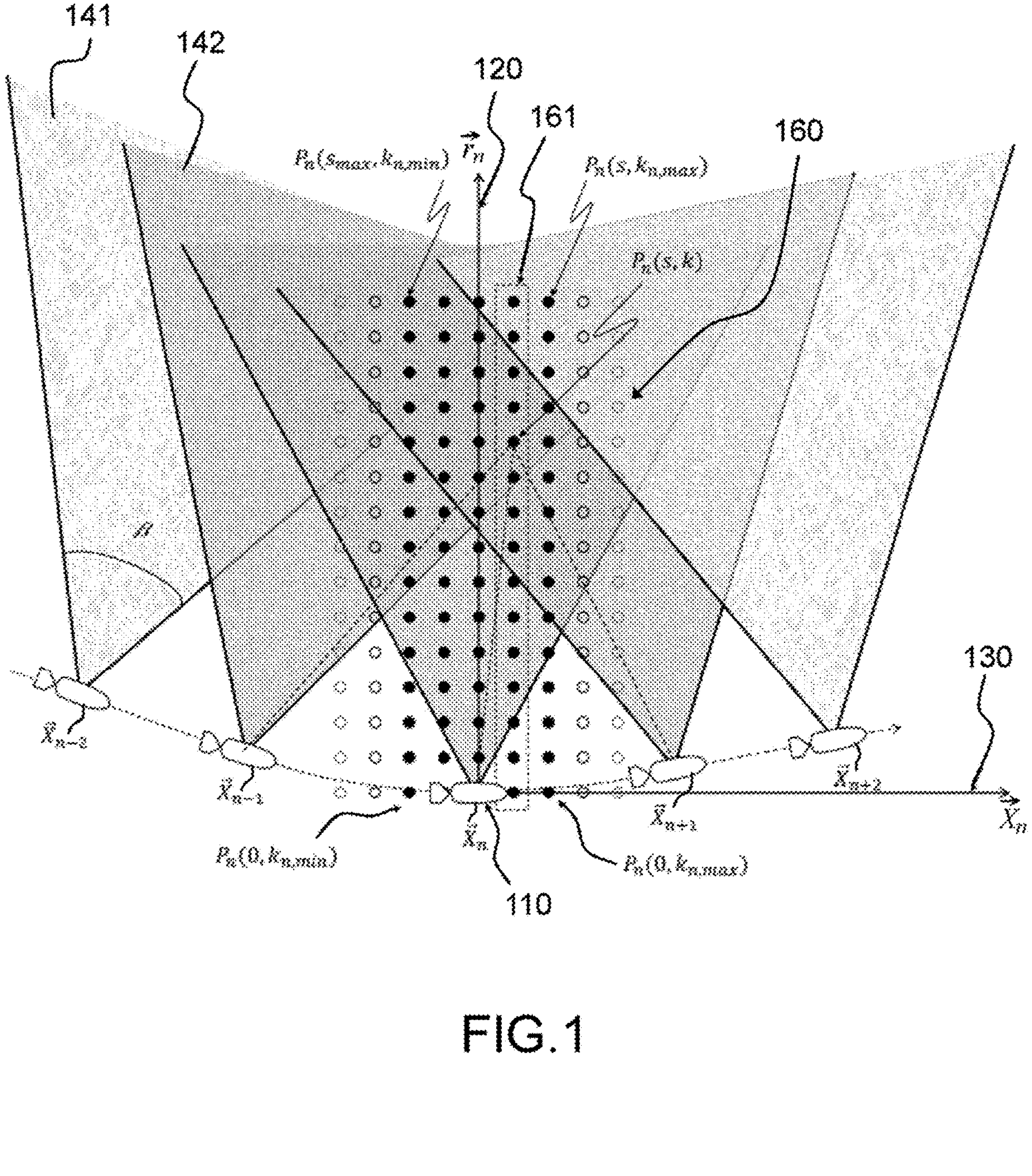
FIG. 1 shows one example of generating a flow of synthetic-antenna sonar images able to serve as a basis for object detection in one set of modes of implementation of the invention.

FIG. 1 shows one example of generating a flow of synthetic-antenna sonar images able to serve as a basis for detecting objects in one set of modes of implementation of the invention.

In this example, a sonar S, mounted on a vehicle, moves along an arbitrary but generally straight trajectory above the seabed. At regular intervals, S emits a pulse for imaging the background along a line of sight that generally aims to the side of the trajectory. $\vec{X}_n$ denotes the position 110 of the sonar during the pulse, $\vec{r}_n$ denotes the unit vector 120 giving the pointing direction of the sonar, and $\vec{x}_n$ denotes the vector 130 tangent to the trajectory of the vehicle at the $n^{th}$ emitted pulse.

The pulse is described as the complex function p, a function either of the time of flight t of the pulse or of the sonar range r at the time of emission, the two variables being linked by the relationship $r=c\times t$, where c is the speed of sound. The pulse is narrowband, modulating a carrier of wavelength $\lambda$.

The operating principle of the synthetic-antenna sonar will be explained taking the example of an arbitrary, fixed target A (that is to say a point for which it is sought to ascertain whether or not it is occupied) in the scene, the position of which is denoted $\vec{A}$.

The sonar S is formed of an emission antenna and a reception antenna. The emission antenna is configured to emit energy in an antenna lobe. For example, the lobes 141 and 142 respectively represent the antenna lobes of the emission antenna for pulses of index n−1 and n−2. The antenna lobe has an aperture $\beta$ in the horizontal plane and an aperture with a bearing large enough to illuminate a large area on the bottom of the body of water. If this lobe is large enough, the object A may be visible on multiple consecutive pulses, with maximum energy when the point is exactly in the line of sight of the sonar.

Assuming that A is the only target, the raw acoustic signal received by the sonar at the $n^{th}$ pulse, for the range r, is modeled as being:

$$s^{raw}(n,r)=K\left(\vec{r_n},\overrightarrow{X_nA}\right)p\left(r-\left\|\overrightarrow{X_nA}\right\|\right)e^{-j\frac{2\pi}{\lambda}\left\|\overrightarrow{X_nA}\right\|}G\left(\left|\angle\left(\vec{r_n},\overrightarrow{X_nA}\right)\right|\right)\quad\text{(Equation 1)}$$

Where:

j is the imaginary number;

K is a link budget term related to the distance between the sonar and the target, and the nature of the target;

G is a gain function related to the antenna and to the absolute value of the angle formed by the vector $\vec{r_n}$ and the vector $\overrightarrow{X_nA}$. This gain function is at a maximum when the angle is zero, and decreases toward zero when the angle exceeds the aperture β. Hereinafter, for simplification, it will be assumed that the gain is unity if the absolute value of the angle is smaller than β and zero otherwise (the sonar illuminates significantly only at an angle β);

< is the symbol of the computation of an angle between two vectors.

In reality, the scene is composed of a multitude of targets 160. The synthetic-antenna integration process is carried out as the pulses progress, as follows: at emitted pulse number n, generating a grid of reference points that are uniformly spaced by a pitch $\delta r^*\vec{r_n}$ on the axis orthogonal to the trajectory and a pitch $\delta r^*\vec{x_n}$ on the axis of the trajectory; the set of targets is therefore defined by:

$$\{P_n(s,k)=s.\delta r.\vec{r}_n+k.\delta x.\vec{x}_n\},\ s=0\,..\,s_{max},\ k=-\infty\,..+\infty\quad\text{(Equation 2)}$$

In which $s_{max}$ is chosen with respect to the maximum range of the sonar.

With a fixed index k, the points $\{p_n(s,k)\}$ form what is referred to as the kth beam of the pulse n (or the $k^{th}$ beam of ping n) 160; the coordinates k and s are called beam index and sample index, respectively. The points $\{p_n(s,k)\}$ are notional reference targets.

A subset of beams $K_n=\{k_{n,min}\ldots k_{n,max}\}$ is then selected, such that the points of these beams are those that have a greater gain at the pulse n (with respect to the position and the attitude of the sonar at this pulse) than the gain obtained for these same points in space at the position and the attitude of the sonar at any other pulse (in other words, these are the points that are able to be imaged best at the pulse n).

For each point (s,k), $k\in K_n$, I(n,s,k), the pulse interval, where $P_n$ (s,k) is illuminated significantly by the sonar, is determined as:

$$I(n,s,k)\triangleq\left\{m\in\mathbb{N}\,\middle|\,\left|\angle\left(\vec{r}_{mr},\overrightarrow{X_mP_n}(s,k)\right)\right|<\beta\right\}\quad\text{(Equation 3)}$$

The synthetic-antenna integration for the point $\vec{P_n}$(i,k) is then carried out by forming the coherent sum of the raw signals obtained for this point, for all of the pulses where this is able to be perceived by the sonar:

$$s^{SAS}\left(\overrightarrow{X_nP_n}(s,k)\right)=s^{SAS}(n,s,k)=\sum_{m\in I(n,s,k)}e^{\frac{j2\pi}{\lambda}\left\|\overrightarrow{X_mP_n}(s,k)\right\|}s^{RAW}\left(m,\left\|\overrightarrow{X_mP_n}(s,k)\right\|\right)\quad\text{(Equation 4)}$$

The datum $S^{SAS}$ (n,s,k) for the beams $K_n=\{k_{n,min}\ldots K_{n,max}\}$ is called SAS antenna for the pulse n, SAS being the acronym for synthetic-aperture sonar. Equation 4 is known as the generalized backpropagation equation.

Next, a function $w^{SAS}$ (i,b), called waterfall function, is defined such that:

$$\begin{cases}b(n,k)=k+\sum_{m=0}^{n-1}|K_m|\\ w^{SAS}(s,b(n,k))=s^{SAS}(n,s,k)\end{cases}\quad\text{(Equation 5)}$$

In which the notation $|K_m|$ designates the cardinal of the set $K_m$. The waterfall may be seen as a complex 2D image, with the axis of the beam indices b being called the azimuth axis and the axis of the indices i being the radial axis. It is also possible to parameterize the waterfall in terms of oblique distance r=s×δr and in terms of curvilinear abscissa x=b×δx.

Figure 2A:
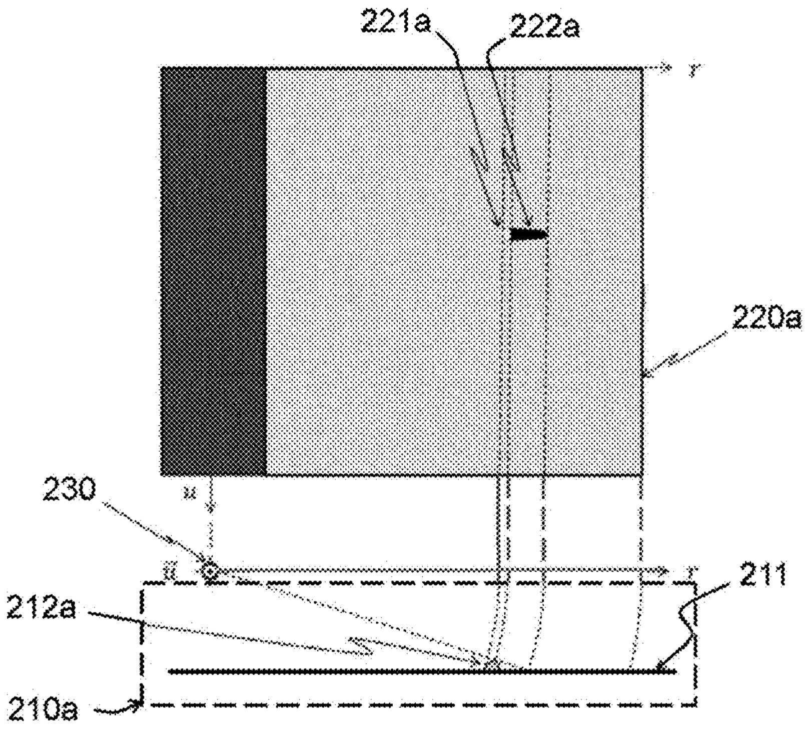
FIG. 2*a* shows a first example of a shadow of a sonar image able to be used by a method according to one set of embodiments of the invention.

FIG. 2*a* shows a first example of a shadow of a sonar image able to be used by a method according to one set of embodiments of the invention.

Figure 2B:
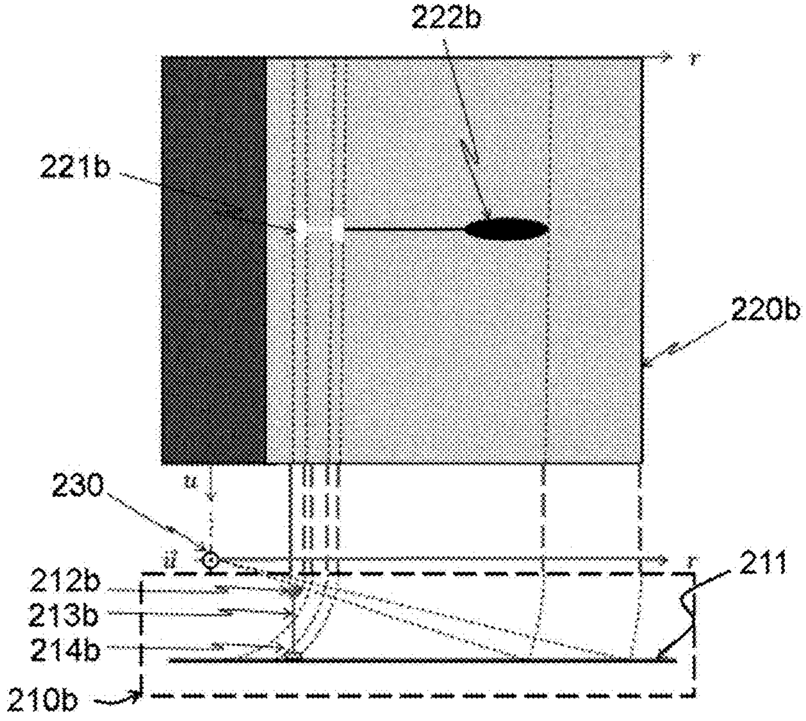
FIG. 2*b* shows a second example of a shadow of a sonar image able to be used by a method according to one set of embodiments of the invention.

FIG. 2*b* shows a second example of a shadow of a sonar image able to be used by a method according to one set of embodiments of the invention.

Shadows are elements that, in an SAS image, contribute greatly to the understanding of the scene for operators or to automatic object detection. Indeed, by the very nature of the imaging process, it appears that echoes are relatively compacted on the oblique distance axis, thereby greatly hindering shape recognition for a human operator or a machine algorithm. On the contrary, when the shadows are extended, they make it possible to guess the shape of the object.

FIGS. 2*a* and 2*b* show two examples of perception of shadows by way of a sonar image. They respectively show two scenes 210*a*, 210*b* on the seabed 211, and two sonar images 220*a*, 200*b* of these two scenes, respectively.

These two scenes respectively show an object 212*a* placed on the seabed, and an object 212*b*, of the same size, floating between two bodies of water and attached to the seabed by a cable 213*b* (rope) attached to a base 214*b* (sinker). The image is produced by a sonar located at the point 230.

In the case of the scene 210*a*, the sonar will perceive the echo 221*a* and the shadow 222*a* of the object 212*a*. In the case of the scene 210*b*, the sonar will perceive the echo 221*b* of the object 212*b*, of the cable 213*b* and of the base 214*b*, and also the shadow 222*b* of the object 212*b* and of the cable 213*b*.

The shadows are therefore defined as areas for which no echo is perceived, because they are masked by an object. It may be seen in FIGS. 2*a* and 2*b* that, at the same size, in the case of an object floating between two bodies of water (midwater) the size of the shadow is significantly greater.

Figure 3:
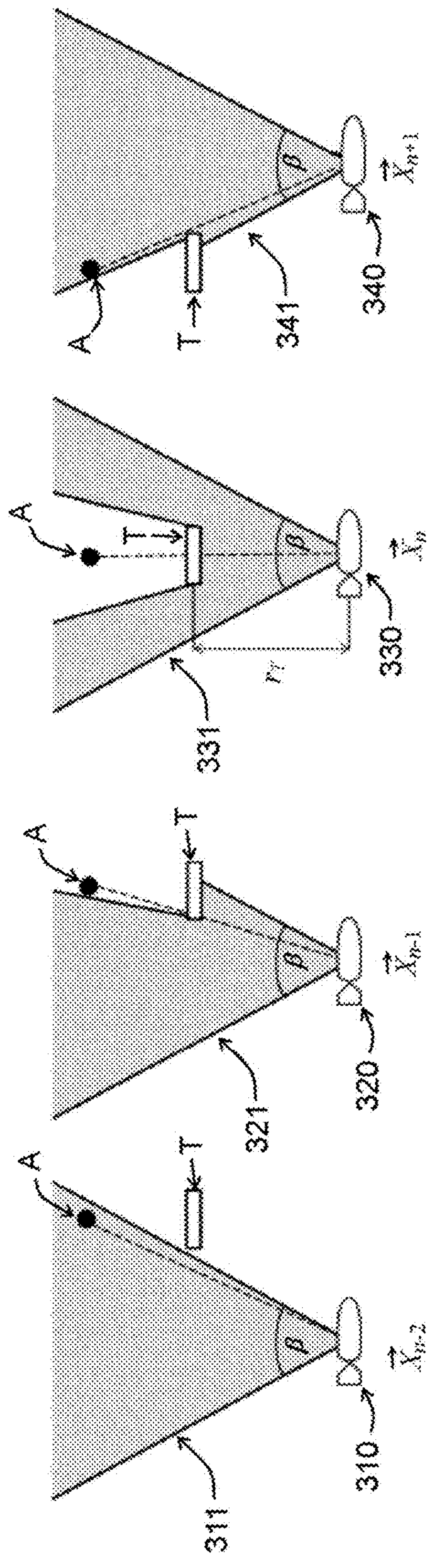
FIG. 3 shows one example of a penumbra effect able to be compensated for as part of one embodiment of the invention.

FIG. 3 shows one example of a penumbra effect able to be compensated for as part of one embodiment of the invention.

A penumbra effect, or parallax effect, is obtained when a target is illuminated only during some of the image captures of a synthetic-antenna sonar.

For example, in the case of FIG. 3, a target A may be masked by an object T. For example:

- In iteration n−2, the sonar is located at the position $\overrightarrow{X_{n-2}}$ 310, and perceives all targets located in the shaded cone 311;
- In iteration n−1, the sonar is located at the position $\overrightarrow{X_{n-1}}$ 320, and perceives all targets located in the shaded cone 321;
- In iteration n, the sonar is located at the position $\overrightarrow{X_n}$330, and perceives all targets located in the shaded cone 331;
- In iteration n+1, the sonar is located at the position $\overrightarrow{X_{n+1}}$ 340, and perceives all targets located in the shaded cone 341.

The target A is therefore illuminated by the sonar in iterations n−2 and n+1, but not in iteration n−1 or in iteration n. FIG. 3 also shows that the shadow cast by the object T varies as a function of the image capture angle. In practice, this means that, in the synthetic-antenna integration, the shadows will not be sharp, but blurred and affected by a penumbra effect.

This penumbra effect may remain acceptable for an object close to the seabed, such as the object 212*a* in FIG. 2*a*, but become problematic for an object stretched lengthwise, or floating between two bodies of water (midwater or floating near the surface), such as the object 212*b* in FIG. 2*b*. In this case, the shadow seen by the synthetic-antenna sonar may be excessively blurry or deformed to be able to recognize the object.

Figure 4A:
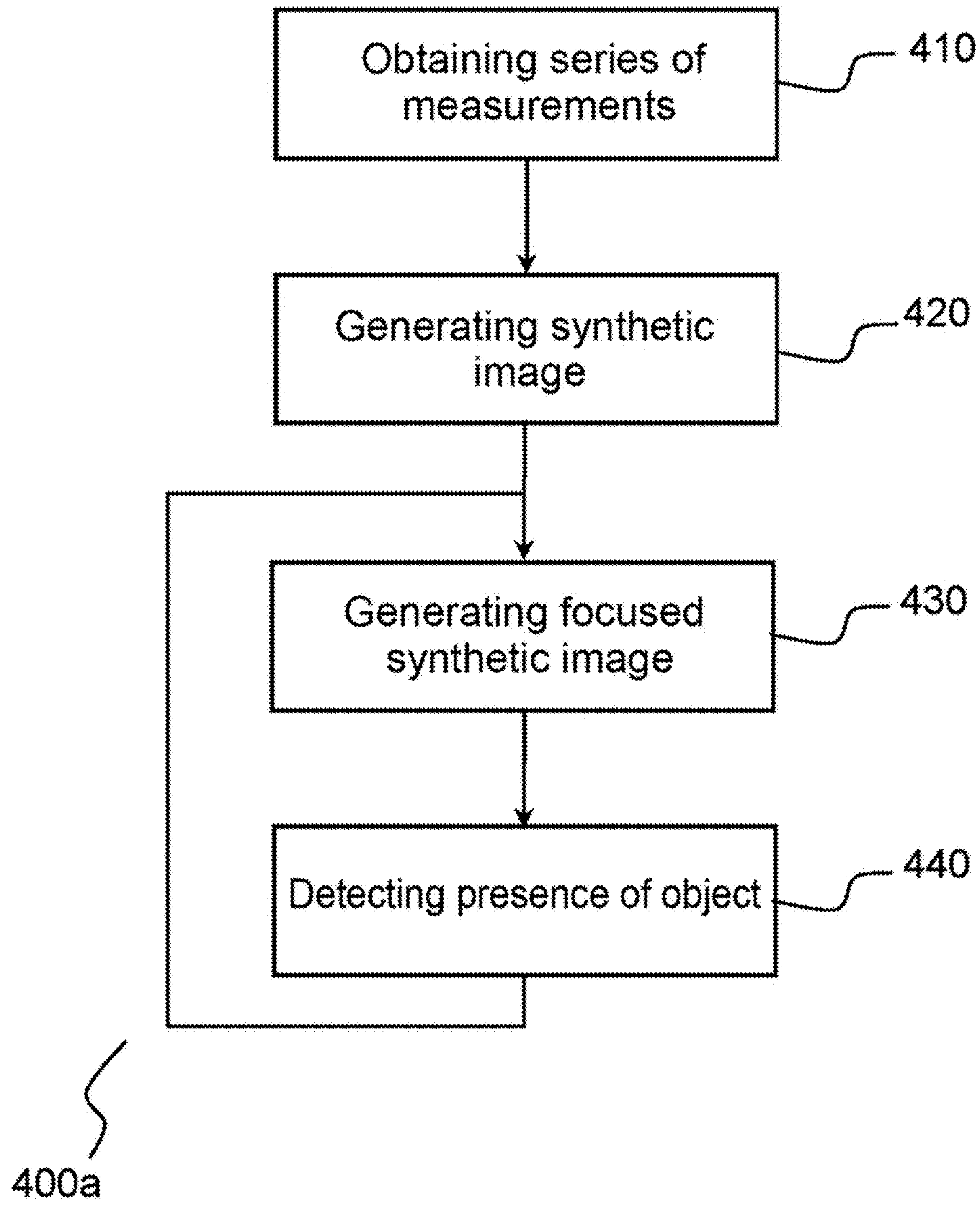
FIG. 4*a* shows a first example of a computer-implemented method in one set of embodiments of the invention.

FIG. 4*a* shows a first example of a computer-implemented method in one set of embodiments of the invention.

The method 400*a* is a computer-implemented method that aims to detect objects that are subject to penumbra effects in measurements from synthetic antennas.

The method 400*a* comprises a first step 410 of receiving a series of distance measurements generated, from a plurality of respectively different positions, by a synthetic-antenna detection system that operates by: emitting a wave; receiving waves reflected by the environment; determining distances by computing differences between the time of emission of the wave and the times of reception of the reflected waves.

The method 400*a* is thus applicable to any synthetic antenna based on the emission of waves at various points, and the reception of reflected waves. It is applicable for example to synthetic-antenna sonars, synthetic-antenna radars, or scanners.

In one set of embodiments of the invention, the detection system is a sonar system forming a synthetic-antenna sonar.

The method 400*a* then comprises a step 420 of generating, based on said series of distance measurements, a synthetic image representing the distances of the environment from a reference position.

This step consists in forming a synthetic image of distances for a given position. For example, in the example shown in FIG. 1, the measurements carried out at the times n−2, n−1, n, n+1 and n+2 may be integrated in order to generate a sonar image for the position 110 at the instant n.

This synthetic image will simply be called "synthetic image", as opposed to the "focused synthetic images" introduced in the remainder of this document. It may also be called "reference synthetic image".

The method 400*a* then comprises, for each focusing distance of a plurality of focusing distances:

- a step 430 of generating, based on said series of distance measurements or said synthetic image, a synthetic image focused at said focusing distance by applying penumbra effect compensation;
- a step 440 of detecting the presence of an object in said focused synthetic image.

In other words, for each distance of a given set of focusing distances, the method 400*a*, in step 430, will generate a synthetic image focused at the desired distance, and then, in step 440, will detect the presence of an object in the focused synthetic image.

Step 430 makes it possible to obtain a synthetic image for which the shadows located at the distance under study are sharp. This therefore makes it possible, in step 440, to carry out object detection based on an image in which the shadows are sharp at a given distance, and therefore to improve object detection.

Steps 430 and 440 may be iterated for each distance of the plurality of distances. Sharp shadows may therefore be obtained for detection, for all desired distances.

The method 400*a* thus enables improved object detection in synthetic images from synthetic antennas that are subject to the penumbra effect.

For step 430, it is possible to use various penumbra effect compensation methods that have the effect of producing sharp shadows at a given distance.

For example, the penumbra effect compensation is carried out using a method known as "FFSE" (fixed focus shadow enhancement), described for example by Groen, J., Hansen, R. E., Callow, H. J., Sabel, J. C., & Sabo, T. O. (2008). Shadow enhancement in synthetic aperture sonar using fixed focusing. *IEEE journal of oceanic engineering,* 34(3), 269-284. That method is presented in that publication in the case of an underwater vehicle moving on a straight trajectory, with a sonar aiming at 90° from the trajectory. In this case, applying FFSE consists in replacing the synthetic-antenna sonar integration equation with the following equation, for a distance $r_t$ from an object:

$$s^{SAS}\left(\overrightarrow{X_nP_n}(s,k)\right) = s_{r_T}^{FFSE}(n,s,k) = \sum_{m\in I(n,s,k)} e^{\frac{j2\pi}{\lambda}\left\|\overrightarrow{X_mP_n}(t,k)\right\|} s^{RAW}\left(m, \left\|\overrightarrow{X_mP_n}(s,k)\right\|\right) \quad \text{(Equation 6)}$$

$$\text{With } t = \left\lfloor \frac{r_T}{\delta r} \right\rfloor$$

In this case, the image associated with a point $P_n$ (s,k) becomes blurry, but the transition between the image and the shadow is sharp. This operation is tantamount to focusing, at the distance $r_T$, all of the points located further away in the range, hence the term fixed focus. The waterfall, or synthetic image associated with the FFSE image, has the same definition (that is to say number of pixels and resolution) as the waterfall, or synthetic image, of the synthetic-antenna sonar.

Another possible penumbra compensation method is what is known as the HVPC (high variant phase compensation) method. The HVPC algorithm may conceptually be seen as a refinement of FFSE, taking into account the height of the object that generated the shadow. This height may be determined in various ways, for example be determined using interferometry, or by a third-party sonar, such as a volume sonar. The height of the object that generated the shadow may also be obtained by trigonometry based on the length of the shadow projected onto the background by the object and knowing the altitude of the sonar (and possibly the local bathymetry, determined using interferometry or by a dedicated sonar).

Figure 5:
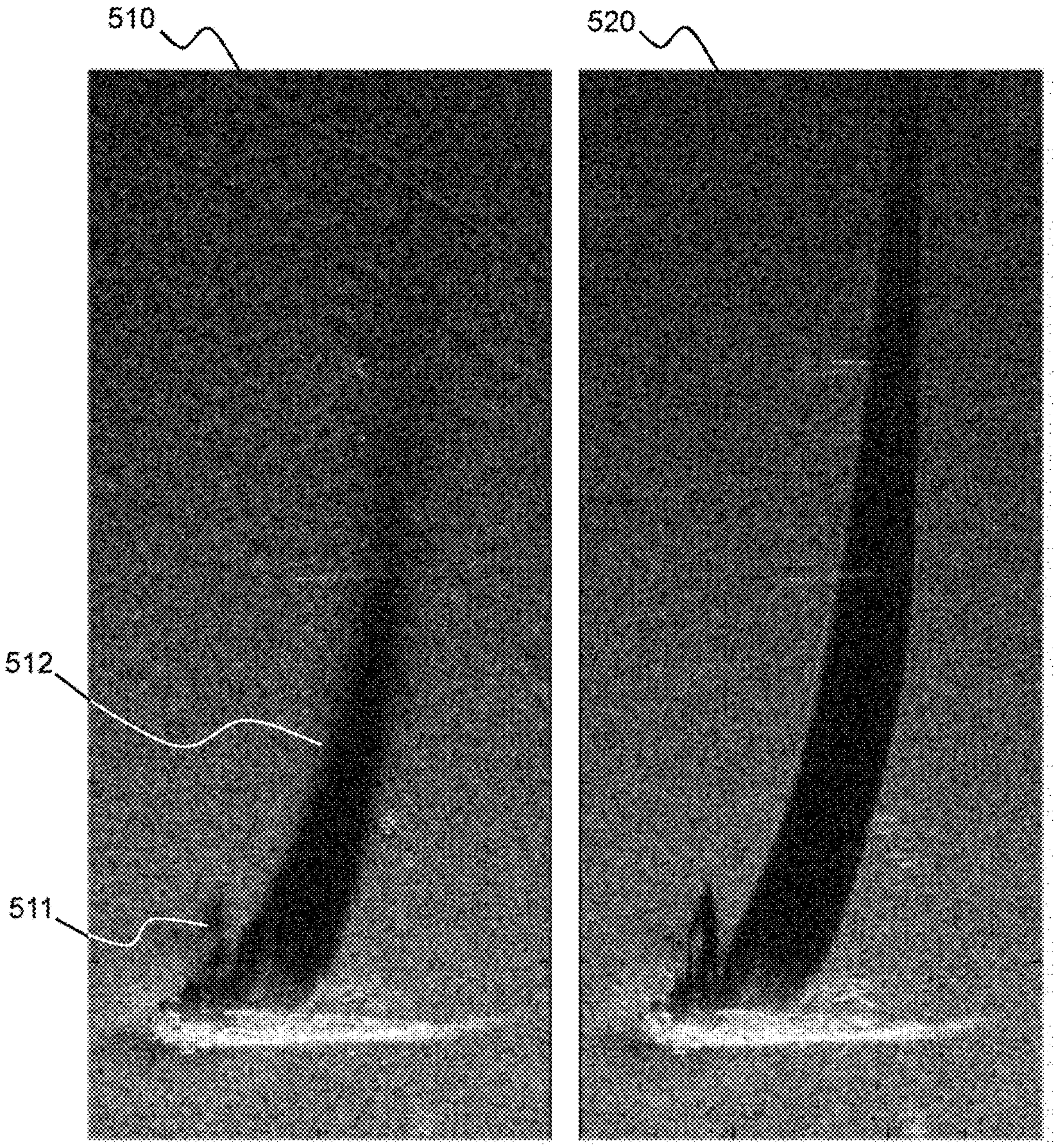
FIG. 5 shows one exemplary application of penumbra effect compensation in one set of embodiments of the invention.

FIG. 5 shows one exemplary application of penumbra effect compensation in one set of embodiments of the invention.

Two images of a seabed scene depicting a shipwreck are shown in FIG. 5.

On the left, the image 510 is obtained using a synthetic-antenna sonar. In this image, the wreck 511 and the shadow 512 generated by the wreck are blurred.

On the right, the image 520 is obtained using the same synthetic-antenna sonar, and has also benefited from the application of a penumbra compensation method, in this example FFSE, parameterized by the distance between the reference point of the image capture and the wreck. In this image, the wreck 521 and the shadow 522 generated by the wreck have become sharp.

This example demonstrates the ability of a penumbra effect compensation method to generate sharp shadows for a given obstacle distance in one set of embodiments of the invention. The shadow that is thus obtained, which is much sharper, may thus be used to carry out object detection more efficiently.

According to various embodiments of the invention, the plurality of focusing distances may be obtained in various ways. For example, a plurality of predefined distances may be used. The distances may be defined by applying a distance pitch over a given range. The distance pitch may be defined so as to ensure that a sufficiently sharp shadow will be obtained for all possible distances within the range.

The focusing distances may for example be defined as distances regularly spaced by a pitch 41 over a distance range [$r_{min}$; $r_{max}$], that is to say the focusing distances are defined by the set {$r_{min}$; $r_{min}+\Delta_1$; $r_{min}+2*\Delta_1$ . . . $r_{max}$}. The parameters $r_{min}$, $r_{max}$ and $\Delta_1$ may be defined in various ways. For example, in one set of embodiments:

$$r_{min} = 2 * w_{min} * \frac{\delta_x}{\lambda},$$

where:

$w_{min}$ is the minimum width of the objects to be detected;

$\delta_x$ is the resolution of the sonar;

$\lambda$ is the emission wavelength of the sonar;

$r_{max}$ is the maximum range of the sonar;

$$\Delta_1 = \frac{r_{min}}{2}.$$

The values of $r_{min}$ and $r_{max}$ may also be defined as a function of the minimum and maximum expected heights of the objects, and also their minimum and maximum expected distances. Indeed, the minimum and maximum heights and distances make it possible to identify the minimum and maximum distances of the shadows cast for the objects. The values of $r_{min}$ and $r_{max}$ may thus be defined as the minimum and maximum focusing distances at which a shadow is expected to be identified in the rest of the sonar range.

More generally, the values $r_{min}$ and $r_{max}$ may be defined so as to determine the minimum and maximum focusing distances at which it is relevant to search for a cast shadow, thus making it possible to limit the computation to distances at which a shadow could be identified. For example, $r_{max}$ may be defined as the minimum out of the maximum range of the sonar and the maximum focusing distance at which a shadow is expected to be identified in the rest of the sonar range.

These values provide a good compromise between an objective of limiting the number of focusing distances to be tested (and therefore computational complexity) and a detection efficiency objective. Indeed, the distance $r_{min}$ corresponds to a distance below which the parallax effect is not significant, and objects may be detected directly without processing; $r_{max}$ is the maximum range of the sonar, and detecting shadows beyond this distance therefore does not make sense; $\Delta_1=r_{min}/2$ is a good compromise in terms of granularity for the focusing distances. These parameters therefore make it possible to test the entire range of relevant distances, while at the same time limiting the complexity of the method.

According to various embodiments of the invention, step 440 of detecting the presence of an object in the focused synthetic image may be carried out in various ways.

In general, any shadow shape detection method may be used. For example, it is possible to use a machine learning method, which may comprise for example the use of artificial neural networks and/or deep learning.

In one set of embodiments of the invention, detecting the presence of an object in said focused synthetic image comprises applying a supervised machine learning engine trained with a learning base comprising focused images of shadows of objects of the same type as said object.

The supervised machine learning engine may thus have been trained with a training base formed of focused shadows of the desired object. For example, if the purpose of the method is to detect the presence of schools of fish, a supervised machine learning engine may have been trained with a database of focused images of shadows of schools of fish.

Such a supervised machine learning engine has the advantage of being able to be trained to detect any type of object, and to provide very efficient detection.

In one set of embodiments of the invention, the method comprises:

prior to the detection:

computing, for each pixel of the focused synthetic image, a ratio $I_r(b,s)$ between the intensities of the pixel of the synthetic image and of the focused synthetic image;

thresholding the pixels of the synthetic image for which this ratio $I_r(b,s)$ is greater than a threshold;

applying a mathematical morphology operation to the thresholded pixels;

applying said detection to the output of said mathematical morphology operation.

If a pixel belongs to a shadow at the focusing distance, it will be darker in the focused image, and therefore its intensity value in the focused synthetic image will be lower than its intensity value in the synthetic image. Therefore, the ratio of the intensity value in the synthetic image divided by the intensity value in the focused synthetic image will be greater than 1. This pixel will therefore be chosen as a potential shadow pixel before the mathematical morphology is applied. In one set of embodiments of the invention, the chosen threshold is however greater than 1, in order to avoid generating false alarms.

In other words, for each of the focusing distances, step 440 may comprise, prior to the detection itself, pre-processing consisting, first of all, in thresholding the pixels corresponding to a shadow, and in then retaining only significant shadows. The detection itself, for example the application of a supervised machine learning engine, then applies only to these pixels belonging to significant shadows.

This makes it possible to make the detection more robust by limiting the detection to the most significant shadows at a given focusing distance.

Once the detection has been carried out, it may be carried out in various ways. By way of non-limiting example:

- An alert may be raised;
- The synthetic image associated with the detection may be presented to an operator;
- The image may be stored in an image bank;
- etc.

More generally, automatic object detection may be used in a large number of fields, and any action able to be associated with automatic image detection may be implemented at the end of the detection.

In one set of embodiments of the invention, the focused synthetic images are generated, for each focusing distance, directly based on the series of distance measurements. For example, in the case of an application of FFSE to measurements from a sonar, this means that the FFSE technique is applied directly, for each focusing distance, to the sensor signals forming SAS beams (SAS beamforming).

Although this solution naturally provides a solution for obtaining focused images, it may prove costly in terms of computing time when focused synthetic images have to be obtained for a large number of focusing distances.

In order to limit computational complexity, in one set of embodiments of the invention, the step of generating, based on said synthetic image, a synthetic image focused at said focusing distance by applying penumbra effect compensation is carried out by applying one-dimensional filtering to the synthetic image.

The costly step of generating a synthetic image based on distance measurements is thus carried out just once, and all of the focused synthetic images are then obtained by 1-dimensional filtering, which is far less resource-intensive.

This method for computing focused synthetic images will now be described in one exemplary application to sonar images using FFSE.

In the case of a sonar orientation at 90° on a linear trajectory, given the SAS waterfall $w^{SAS}(b,s)$ obtained using the SAS process with sampling at a pitch $\delta x$ on the azimuth axis (finer than the physical resolution of the synthetic antenna) and a pitch or on the distal axis, the FFSE image may be obtained, to within a constant multiplicative coefficient, based on said waterfall by 1D (1-dimensional) matched filtering (that is to say a 1D correlation), on each column of constant index s, using the following signal described in the spatial domain and centered around b=0:

$$h_{r_t}^{APFFSE}(b,s) = K.p^2(b)e^{j\frac{4\pi f_0}{c_0}\left(\sqrt{(s.\delta r)^2+(b.\delta x)^2}-\sqrt{r_t^2+(b.\delta x)^2}\right)} \quad \text{(Equation 7)}$$

Where:

$$s = \left\lfloor \frac{r}{\delta r} \right\rfloor;$$

$$b = \left\lfloor \frac{x}{\delta x} \right\rfloor;$$

K is a normalization multiplicative constant;

p(b) is an apodization function, which may be Gaussian, by way of non-limiting example:

$$p(b,s,\beta) = \exp\left(-\frac{(b.\delta x)^2}{2\left(\alpha.s.\delta r.\tan\left(\frac{\beta}{2}\right)\right)^2}\right) \quad \text{(Equation 8)}$$

$\alpha$ is an adjustment parameter, for example $\alpha=1$;

$\beta$ is the angular aperture of the emitter.

The purpose of this apodization function is to limit the spatial support of the filter to the spatial domain where the target at the range s.$\delta$r is illuminated, this illumination taking place over a length of typical standard deviation $$s.\delta r.\tan\left(\frac{\beta}{2}\right).$$

This result may be applied generally to the case where depointing is no more than 90°, at the expense of making the equations slightly more complicated. In this case, it is indeed necessary to consider a depointing angle $\theta_s$ and to take this depointing into account for the computing of the convolution filter $$h_{r_t}^{APFFSE}$$

or spectral filter $$H_{r_t}^{APFFSE}.$$

The exact formulation will depend on the beam geometry of the synthetic image that is formed, and involves adding terms in $\cos(\theta_s)$ and $\sin(\theta_s s)$ to the formulations of $$h_{r_t}^{APFFSE}$$

and $$H_{r_t}^{APFFSE}.$$

FFSE may then be applied, to obtain a focused synthetic image, by way of 1D filtering of the waterfall, which may be implemented by way of 1D correlation for each column s:

$$w'(b,s) = \left(h_{r_t}^{APFFSE} \star w^{SAS}\right)(b,s) \quad \text{(Equation 9)}$$

In equivalent fashion, this operation may be implemented by a product in the spectral domain:

$$W'(\xi,s) = W_s^{SAS}(\xi,s) \times H_{r_t}^{APFFSE}(\xi,s) \quad \text{(Equation 10)}$$

Where $$W_s^{SAS}(\xi, s), H_{r_t}^{APFFSE}(\xi, s)$$

and W'(ζ, s) denote the Fourier transforms according to b (or on the azimuth axis x) respectively of the reference SAS waterfall $w^{SAS}$(b,s), of the FFSE filter $$h_{r_t}^{APFFSE}(b, s)$$

and of the refocused waterfall w'(b,s).

The refocusing of the SAS beams, that is to say the transformation of the synthetic image into a focused synthetic image, may thus be carried out by:

- carrying out the Fourier transform $$W_s^{SAS}(\xi, s)$$

on the image beams $w^{SAS}$(b,s);
- multiplying this Fourier transform by the filter $$H_{r_t}^{APFFSE}(\xi, s),$$

storing the result in W'(ζ, s);
- carrying out the inverse Fourier transform of W'(ζ, s) in order to obtain the refocused image beams w'(b,s).

The refocusing may thus be applied to an already formed SAS image and be efficiently carried out by way of Fast Fourier Transforms (FFT). The focusing may therefore be carried out quickly and inexpensively over a large number of focusing distances.

It is also possible to carry out the inverse operation, that is to say to switch from a focused synthetic image (for example an FFSE focused image) to a synthetic image (for example a reference SAS image), by convoluting the focused synthetic image using the inverse filter $$h_{r_t}^{APFFSE^{-1}},$$

this being tantamount to dividing by $$H_{r_t}^{APFFSE}(\xi, s)$$

in the spectral domain.

In one set of embodiments, this operation may be used to enrich a learning database for object detection.

To this end, in one set of embodiments of the invention, the method 400 comprises:

- generating a modified focused synthetic image by adding a shadow associated with a label to said synthetic image focused at said focusing distance;
- generating a modified synthetic image by applying an inverse filter of said one-dimensional filter to the modified focused synthetic image;
- enriching a learning base for detecting the presence of an object with the modified focused synthetic image, said focusing distance and said label.

In other words, a sharp shadow corresponding to a known object is added to an image focused at the focusing distance, and then inverse 1D filtering is applied in order to retrieve a reference synthetic image (for example reference SAS image) comprising the unfocused shadow. This image is added to a training base for detecting the presence of objects, with an object label (defining the type of object) and the focusing distance. The combination of the modified synthetic image, the focusing distance and the label corresponding to the type of object thus makes it possible to train the object detection at various focusing distances (the focusing distances at which the object of said type should or should not be detected are then known).

This makes it possible to efficiently construct a training base, since this offers the possibility of generating a large number of images for the training base, with a large number of shadow images, for a large number of focusing distances. This therefore makes it possible to train the object detection efficiently and quickly, for example by training a supervised learning engine for object detection. This also limits the need to obtain real images, thereby greatly simplifying the construction of the training base.

Figure 4B:
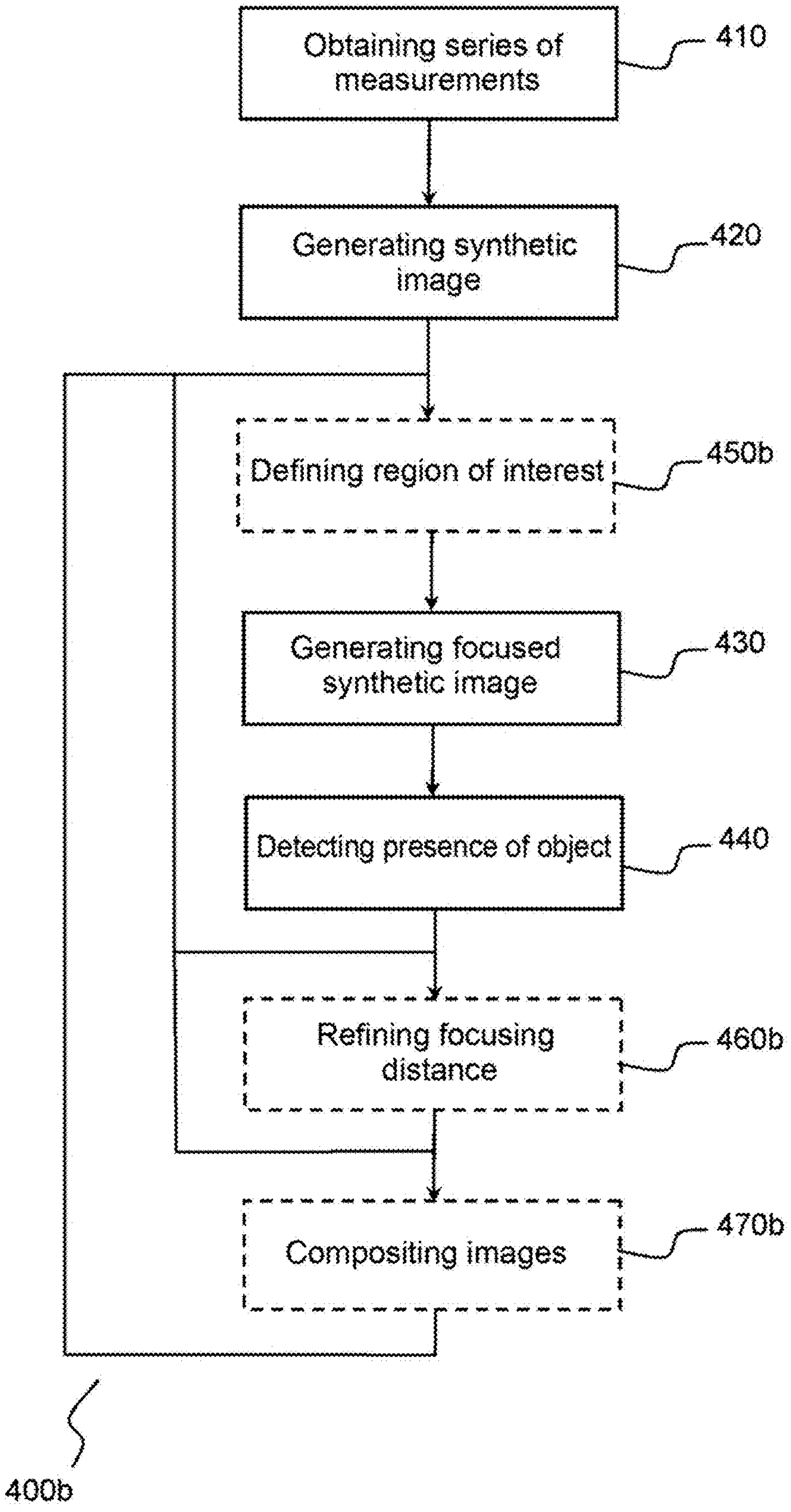
FIG. 4*b* shows a second example of a method in one set of embodiments of the invention.

FIG. 4*b* shows a second example of a method in one set of embodiments of the invention.

The method 400*b* comprises all of the steps of the method 400*a*, and also three optional steps 450*b*, 460*b* and 470*b*. It should be noted that, although the three steps are shown in FIG. 4*b*, the three steps 450*b*, 460*b* and 470*b* may be executed independently. According to various embodiments of the invention, a method according to the invention may therefore comprise these three steps, none of them, or any combination of these three steps.

In step 460*b*, the focusing distances are refined, that is to say focusing distances are tested more finely around a distance considered to be relevant.

In one set of embodiments of the invention, the plurality of focusing distances thus comprises a plurality of initial focusing distances defined by a first distance pitch over a first range of focusing distances, and the method comprising:

- a step 460*b* of defining a plurality of refined focusing distances, which are defined by:
- a second range of focusing distances, narrower than the first, around a first focusing distance of said plurality of initial focusing distances, at which the presence of an object has been detected;
- a second distance pitch, smaller than the first;
- for each focusing distance from among said plurality of refined focusing distances:
- the step 430 of generating, based on said series of distance measurements, a synthetic image focused at said focusing distance by applying penumbra effect compensation.

In other words, initial focusing distances may be the set of distances of a range [$r_{min}$; $r_{max}$] with a coarse pitch $\Delta_1$ (that is to say the initial distances are defined by the set {$r_{min}$; $r_{min}+\Delta_1$; $r_{min}+2*\Delta_1 \ldots r_{max}$}; a first focusing distance $r_{fest}$ is selected from among the focusing distances, and then a range of refined distances is defined around the first focusing distance $r_{fest}$ at which the presence of an object has been detected, with a finer pitch $\Delta_2<\Delta_1$. For example, the refined focusing distances may be selected with the pitch $\Delta_2$ over the interval [$r_{fest}-\Delta_1$; $r_{fest}+\Delta_1$].

Next, the focusing step 430 is carried out for each refined focusing distance.

This makes it possible to test the focusing distances with a finer pitch around a focusing distance at which the presence of an object has been detected, and thus to enable focusing at a distance potentially closer to the distance of the object.

This makes it possible to obtain accurate results while at the same time limiting the computational load required by the method, since the focusing distances are tested with a coarse pitch over the entire possible range, but with a finer pitch for a range of focusing distances of interest.

The first focusing distance is thus a focusing distance for which the presence of an object has been detected.

In other words, as soon as an object is detected in step 440, the focusing distances are refined around the focusing distance that led to the detection of the object.

This makes it possible to refine the detection of objects around distances generating a detection, and therefore around the most relevant distances for detecting objects.

In this case, the refinement may be referred to as autofixed focus, because it consists in automatically determining the focusing distance that produces the sharpest shadows.

Various sharpness indices may be used. By way of non-limiting example, the metrics introduced by A. Buffington, F. S. Crawford, R. A. Muller, A. J. Schwemin and R. C. Smits, "Correction of atmospheric distortion with an image-sharpening telescope", *Jour. Acoust. Soc. Am., Vol.* 67, no. 3, pp. 298-303, March 1977 may be used.

In one set of embodiments of the invention, the method 400*b* comprises, in the event of detection of the presence of an object in said focused synthetic image, a step 470*b* of generating a composite image based on said synthetic image and said focused synthetic image.

Indeed, as mentioned above, the focused synthetic image makes it possible to obtain sharp echoes and shadows for a given focusing distance, but while blurring the rest of the image. On the contrary, the unfocused synthetic image is sharper over the entire image, but exhibits the penumbra effect. The composite image produced based on the synthetic image and the focused synthetic image may therefore, at the same time, be sharp overall over the entire image and not exhibit a penumbra effect but, on the contrary, exhibit sharp shadows at the focusing distance.

Compositing step 470*b* therefore makes it possible to obtain an image that is as relevant as possible to be presented to an operator, in which the shadows are sharp at a given focusing distance, without sacrificing the sharpness of the rest of the image. This step may be carried out in various ways.

In one set of embodiments of the invention, step 470*b* of generating the composite image comprises:

- detecting shadows in the focused synthetic image;
- assigning the following for each pixel of the composite image:
- the intensity value of the corresponding pixel of the focused synthetic image for each pixel belonging to a shadow;
- the intensity value of the corresponding pixel of the synthetic image otherwise.

In other words, shadows are detected in the focused synthetic image, and the pixels of the composite image come from:

- the focused synthetic image, for pixels belonging to a shadow;
- the synthetic image for the others.

This provides a simple and effective solution for obtaining a composite image with sharp shadows, without sacrificing the general quality of the image.

Other ways of generating the composite image may be envisaged.

For example, in one set of embodiments of the invention, said generating the composite image comprises assigning, for each pixel of the composite image, an intensity value equal to the weighted sum of the intensity value of the corresponding pixel of the focused synthetic image and of the intensity value of the corresponding pixel of the synthetic image, where, for each pixel, the relative weight of the intensity value of the corresponding pixel of the focused synthetic image increases with an index of belonging to a shadow of the pixel.

Thus, in this case, the pixel intensity values are not selected exclusively from one image or the other, but are defined as a weighted average of the intensity values in both images, where the relative weight of the intensity of the corresponding pixel of the focused synthetic image is greater when the pixel is considered to belong to a shadow.

This makes it possible to benefit from the sharpness of the shadow from the focused synthetic image, while at the same time benefiting from a more gradual transition between shadows and the rest of the image.

The relative weight of the pixels from the two images (synthetic image and focused synthetic image) may be computed in various ways. For example, a low-pass filter may be applied to the focused synthetic image. Indeed, the low-pass filter makes it possible to efficiently determine the pixels forming or not forming part of a shadow.

For example, if the synthetic image is denoted $I_A(b,s)$, the focused synthetic image is denoted $I_B(b,s)$, the composite image is denoted $I_C(b,s)$, and the focusing distance under consideration is denoted $r_T$, then the composite image may be generated as follows:

- For all pixels corresponding to an area closer than $r_T$ ($s.\delta r < r_T$), which by definition cannot correspond to a shadow generated by an object at this distance $r_T$, the value of the pixel will be taken from the synthetic image: $I_C(b,s) \leftarrow I_A(b,s)$
- For the other pixels (that is to say those such that $s.\delta r \geq r_T$), there is a process of:
  - Computing $m_a$ the average of $I_A(b,s)$ and $m_b$ the average of $I_B(b,s)$ for all values of b, s;
  - Generating $I_{LP}$ a low-pass-filtered image of $|I_B|$ using a support filter with B beams and S samples, B and S being adjustment parameters of the filter. $m_{LP}$ denotes the average of $I_{LP}$;
  - Generating a weight $$w_C(b, s) = \frac{1}{1 + e^{-\frac{20\,log_{10}|I_{LP}(b,s)| - T}{\tau}}}$$

for each pixel, where T is a shadow threshold in dB and t is a filter adjustment parameter (log-sigmoidal weighting);

- Computing $$I_C(b, s) \leftarrow \left(\frac{w_C(b, s)}{m_A} I_A(b, s) + \frac{1 - w_C(b, s)}{m_B} I_B(b, s)\right) \times m_A$$

Each pixel of the composite image is thus a weighted average of the corresponding pixels of the synthetic image and the focused synthetic image, giving more weight to the focused synthetic image in shadow areas, and more weight to the synthetic image in other areas, while at the same time ensuring a smooth transition between these two types of areas.

In one set of embodiments of the invention, the method **400*b* comprises defining 450*b* a region of interest of the synthetic image, and steps 430 of generating the focused synthetic image and 440** of detecting an object are carried out only in the region of interest.

This makes it possible to limit the complexity of the method, since steps 430 and 440 are carried out only on a region of interest considered to be relevant.

In one set of embodiments of the invention, the region of interest comprises the entire image based on the focusing distance. In other embodiments of the invention, the region of interest comprises only a sub-part of the image, resulting from a division of the total image into blocks of beams or defined by a user, for example.

Figure 6:
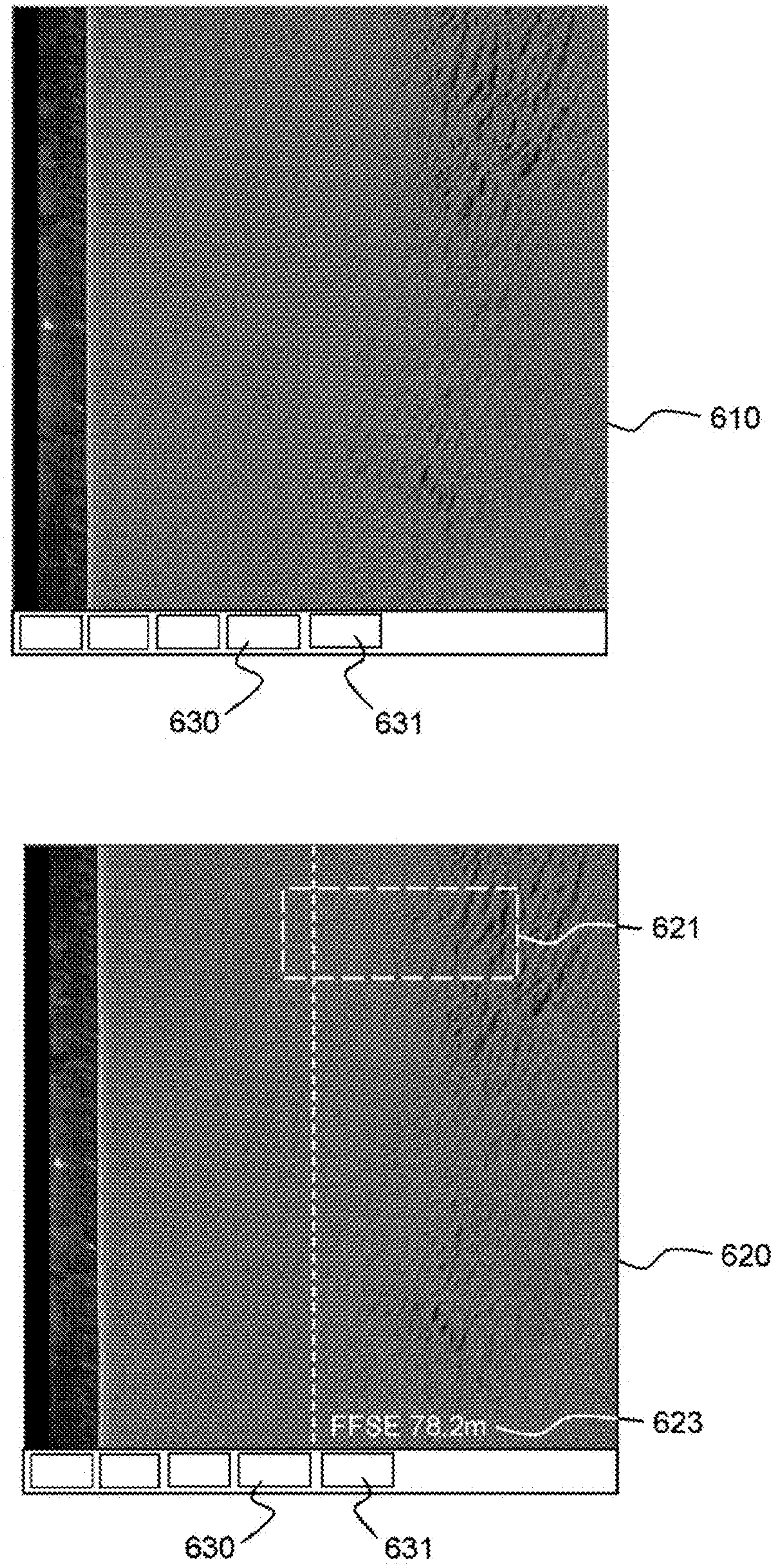
FIG. 6 shows one example of a graphical interface for defining a region of interest, and for displaying the focused synthetic image or the composite image in this region of interest.

FIG. 6 shows one example of a graphical interface for defining a region of interest, and for displaying the focused synthetic image or the composite image in this region of interest.

In one set of embodiments of the invention, defining the region of interest of the synthetic image comprises:

- displaying the synthetic image on a graphical interface 610, 620;
- a user drawing a rectangle 621 defining the region of interest.

FIG. 6 shows two successive states 610, 620 of such a graphical interface.

In a first state 610, the graphical interface represents a synthetic image, or waterfall, of a sonar. In this representation, the range is defined by the horizontal axis: the pixels furthest to the right correspond to the points furthest from the sensor; the beams are defined by the vertical axis: the lowest points correspond to the beams acquired at the oldest dates and the highest points correspond to the beams acquired at the most recent dates.

The user is able, in the interface, to trigger the definition of the region of interest, for example by pressing a button 630, and trigger the compositing, for example by pressing the button 631. However, these buttons are provided only by way of example, and other means may be used to trigger the definition of the region of interest and/or the compositing, such as keyboard shortcuts or voice commands, for example.

In the example of FIG. 6, when the button 630 is activated by the user, the graphical interface moves to a step 620, where a rectangle 621 representing the region of interest appears:

- The left-hand vertical edge of the rectangle 621 represents the shortest range covered by the region of interest;
- The right-hand vertical edge of the rectangle 621 represents the longest range covered by the region of interest;
- The upper horizontal edge of the rectangle 621 represents the most recent beams covered by the region of interest;
- The lower horizontal edge of the rectangle 621 represents the oldest beams covered by the region of interest.

In this example, the user may thus manually define the region of interest directly on the synthetic image. The user may modify the region of interest by modifying the rectangle, for example by modifying the rectangle using a moving cursor (which may for example be manipulated using an input interface such as a mouse or touch sensor): for example, the user may drag a corner, drag an edge, or drag-and-drop the entire rectangle.

In one embodiment of the invention, the method **400*b*** comprises displaying the focused synthetic image or the composite image inside said rectangle.

In the example of FIG. 6, the composite image is generated for the region of interest defined by the rectangle 621, and displayed directly in this rectangle.

This allows the user to directly visualize the effect of the focusing on the image.

The composite image may be generated and displayed when the user presses the button 631, or makes another compositing command (keyboard shortcut, voice command, etc.).

As an alternative, the compositing and the display may be carried out in real time, when the rectangle 621 is displayed, and as soon as the user modifies the rectangle 621. This allows the user to visualize the result of the focusing and the compositing in real time.

In the example of FIG. 6, the focusing and the shadow detection are parameterized by a reference range $r_T$ represented by the line 622, which may also be moved by the user to modify the parameterization. Like for the rectangle 621, a movement of the line 622 may result in the focusing, the shadow detection, the compositing and the displaying of the focused or composite synthetic image being carried out again in real time. The reference range $r_T$ may be displayed 623 to the user.

The user is thus able, in real time, to modify the shadowing parameters and visualize the obtained result.

The above examples demonstrate the ability of the invention to improve the detection of objects in images from a synthetic antenna. However, they are given only by way of example and in no way limit the scope of the invention as defined in the claims below.

The invention claimed is:

1. A computer-implemented method for detecting objects subject to penumbra effects, the method comprising:

- receiving a series of distance measurements generated, from a plurality of respectively different positions, by a sonar detection system comprising a synthetic antenna, the detection system operating by:
- emitting a wave;
- receiving waves reflected by the environment;
- determining distances by computing differences between the time of emission of the wave and the times of reception of the reflected waves;
- generating, based on said series of distance measurements, a synthetic image using said synthetic antenna, the synthetic image representing the distances of the environment from a reference position;
- for each focusing distance of a plurality of focusing distances:
- generating, based on said series of distance measurements or said synthetic image, a focused synthetic image focused at said focusing distance by applying penumbra effect compensation;
- detecting the presence of an object in said focused synthetic image.

2. The method as claimed in claim 1, wherein detecting the presence of an object in said focused synthetic image comprises applying a supervised machine learning engine trained with a learning base comprising focused images of shadows of objects of the same type as said object.

3. The method as claimed in claim 1, comprising:

- prior to the detection:
- computing, for each pixel of the focused synthetic image, a ratio between the intensities of the pixel of the synthetic image and of the focused synthetic image;
- thresholding the pixels of the synthetic image for which this ratio is greater than a threshold;

applying a mathematical morphology operation to the thresholded pixels;

applying said detection to the output of said mathematical morphology operation.

4. The method as claimed in claim 1, wherein the plurality of focusing distances comprises a plurality of initial focusing distances defined by a first distance pitch over a first range of focusing distances, the method comprising:

a step of defining a plurality of refined focusing distances, which are defined by:

a second range of focusing distances, narrower than the first, around a first focusing distance of said plurality of initial focusing distances, at which the presence of an object has been detected;

a second distance pitch, smaller than the first;

for each focusing distance from among said plurality of refined focusing distances, said generating, based on said series of distance measurements, a synthetic image focused at said focusing distance by applying penumbra effect compensation.

5. The method as claimed in claim 1, wherein the step of generating, based on said synthetic image, a synthetic image focused at said focusing distance by applying penumbra effect compensation is carried out by applying a one-dimensional filter to the synthetic image.

6. The method as claimed in claim 5, comprising:

generating a modified focused synthetic image by adding a shadow associated with a label to said synthetic image focused at said focusing distance;

generating a modified synthetic image by applying an inverse filter of said one-dimensional filter to the modified focused synthetic image;

enriching a learning base for detecting the presence of an object with the modified focused synthetic image, said focusing distance and said label.

7. The method as claimed in claim 1, comprising, in the event of detection of the presence of an object in said focused synthetic image, generating a composite image based on said synthetic image and said focused synthetic image.

8. The method as claimed in claim 7, wherein said step of generating the composite image comprises:

detecting shadows in the focused synthetic image;

assigning the following for each pixel of the composite image:

the intensity value of the corresponding pixel of the focused synthetic image for each pixel belonging to a shadow;

the intensity value of the corresponding pixel of the synthetic image otherwise.

9. The method as claimed in claim 7, wherein said step of generating the composite image comprises assigning, for each pixel of the composite image, an intensity value equal to the weighted sum of the intensity value of the corresponding pixel of the focused synthetic image and of the intensity value of the corresponding pixel of the synthetic image, where, for each pixel, the relative weight of the intensity value of the corresponding pixel of the focused synthetic image increases with an index of belonging to a shadow of the pixel.

10. The method as claimed in claim 1, comprising defining a region of interest of the synthetic image, wherein the steps of:

generating, based on said series of distance measurements, a synthetic image focused at said focusing distance by applying penumbra effect compensation; and detecting the presence of an object in said focused synthetic image are carried out only in the region of interest.

11. The method as claimed in claim 10, wherein defining the region of interest of the synthetic image comprises:

displaying the synthetic image on a graphical interface;

a user drawing a rectangle defining the region of interest.

12. The method as claimed in claim 10, comprising, in the event of detection of the presence of an object in said focused synthetic image, generating a composite image based on said synthetic image and said focused synthetic image, comprising displaying the focused or composite image inside said rectangle.

13. A computer program product comprising computer code instructions that, when the program is executed on a computer, cause said computer to execute the method as claimed in claim 1.

14. A data processing system comprising a processor configured to implement the method as claimed in claim 1.

15. A computer-readable recording medium comprising instructions that, when they are executed by a computer, cause said computer to implement the method as claimed in claim 1.

* * * * *